US008825922B2

(12) United States Patent
Mayer et al.

(10) Patent No.: US 8,825,922 B2

(45) Date of Patent: Sep. 2, 2014

(54) ARRANGEMENT FOR PROCESSING TRACE DATA INFORMATION, INTEGRATED CIRCUITS AND A METHOD FOR PROCESSING TRACE DATA INFORMATION

(75) Inventors: Albrecht Mayer, Deisenhofen (DE); Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 105 days.

(21) Appl. No.: 13/088,498

(22) Filed: Apr. 18, 2011

(65) Prior Publication Data

US 2012/0266029 A1 Oct. 18, 2012

(51) Int. Cl.

*G06F 13/28* (2006.01)
*G06F 11/00* (2006.01)
*G06F 11/34* (2006.01)
*G06F 11/36* (2006.01)

(52) U.S. Cl.

CPC ............ *G06F 11/3466* (2013.01); *G06F 13/28* (2013.01); *G06F 11/3656* (2013.01)

USPC ............................................... 710/22; 714/45

(58) Field of Classification Search

None

See application file for complete search history.

(56) References Cited

U.S. PATENT DOCUMENTS 7,143,205 B2 11/2006 Sakugawa
2003/0037188 A1 2/2003 Hagen
2005/0268177 A1* 12/2005 John .............................. 714/47
2010/0257510 A1* 10/2010 Horley et al. ................. 717/128
2011/0246836 A1* 10/2011 Walker et al. ................... 714/45
2012/0023281 A1* 1/2012 Kawasaki et al. ............ 710/312

OTHER PUBLICATIONS

White Paper "Better Trace for Better Software"—Introducing the new ARM CoreSight System Trace Macrocell and Trace Memory Controller Roberto Mijat 2010; pp. 1-12.

Multi Core Debug Solution "MCDS" May 22, 2007 Infineon Technologies pp. 20-36.

A White Paper presented by IPextreme "Multi-Core Debug Solution IP"—SoC Software Debugging and Performance Optimization May 2007, Dr. Albrecht Mayer et al. pp. 1-23.

IEEE-ISTO Industry Standards and Technology Organisation The Nexus 5001 Forum—Standard for a Global Embedded Processor Debug Interface Version 2.0—Dec. 23, 2003 pp. 1-166.

CoreSight Trace Memory Controller—Revision: r0p1 Technical Reference Manual 2010 ARM ARM DDI 0461B pp. 1-116.

CoreSight Technology System Design Guide 2004, 2007, 2010 ARM Limited ARM DGI 0012D (ID062610) pp. 1-114.

32-Bit—TC1767 32-Bit Single-Chip Microcontroller User's Manual V1.1 Edition May 2009 Published by Infineon Technologies AG, 81726 Munich, Germany.

Infineon IP Ecosystem For IPextreme World 2007 Dec. 11, 2007—Hsinchu, Taiwan.

* cited by examiner

*Primary Examiner* — Idriss N Alrobaye
*Assistant Examiner* — Richard B Franklin

(57) ABSTRACT

An arrangement for processing trace data information is provided, the arrangement including, a chip including one or more memory circuits configured to store trace data information relating to a series of instructions, and a trace data information port configured to provide off-chip access to the trace data information; and a direct memory access controller circuit configured to control the transportation of trace data information from the one or more memory circuits to the trace data information port.

23 Claims, 8 Drawing Sheets

100
102
106
System Bus (e.g. AMBA AHB/AXI)
118
AN Other System Bus
120
114
Cross trigger matrix
126
JTAG Debug Port
148
104
ARM11 Core
104
ARM9 Core
JTAG
110
146
108
108
112
Bus trace
116
ETM11 CS
106
ETM9 CS
106
trace
132
142
122
128
RVD
144
Trace bus (ATB)
124
RealView ICE
134
Funnel
138
136
140
Trace port
Buffer
RealView Trace
130

106
802
800
System Bus (e.g. AMBA AHB/AXI)
118
AN Other System Bus
120
114
Cross trigger matrix
104
104
JTAG
110
146
126
148
JTAG Debug Port
ARM11 Core
ARM9 Core
128
132
108
108
112
Bus trace
116
RVD
ETM11 CS
ETM9 CS
trace
106
106
144
142
122
Buffer
806
RealView ICE
Trace bus (ATB)
810
Trace port
804
DMA Controller
808
RealView Trace
130

ARRANGEMENT FOR PROCESSING TRACE DATA INFORMATION, INTEGRATED CIRCUITS AND A METHOD FOR PROCESSING TRACE DATA INFORMATION

TECHNICAL FIELD

Various embodiments relate generally to an arrangement for processing trace data information, integrated circuits and a method for processing trace data information.

BACKGROUND

On-chip trace data information sources for debugging trace information data e.g. instruction trace data information and data trace information relating to data transfer information and signaling information, require an increasing amount of bandwidth due to an increased number of processor cores and on-chip busses and rising clock frequencies. Although the cost of outputting trace over chip/package pins is declining, it is declining less rapidly than the cost of transistor components such as logic, and random access memory cells. Therefore, the price for outputting high bandwidth over pins is becoming prohibitively expensive.

It is possible to output compressed trace data information over package pins, i.e. off-chip traces, e.g. over the Nexus ISTO-5001 standard or ARM ETM, up to a limited number of cores and clock frequency. For higher bandwidth, High-Speed Serial Ports (HSSP) are currently being evaluated in the industry. HSSP will increase the bandwidth per pin, however significant costs are incurred on the chip, e.g. PHY, GigaHz phase-locked loop circuits, and for the tooling. Another conventional approach is to implement an on-chip trace, wherein the on-chip components, e.g. logic, and random access memory scale with process technology. The on-chip approach allows a very high bandwidth for tracing but only over a short duration due to the limited on-chip trace buffer.

SUMMARY

In various embodiments, an arrangement for processing trace data information is provided. The arrangement may include a chip including one or more memory circuits configured to store trace data information relating to a series of instructions, and a trace data information port configured to provide off-chip access to the trace data information; and a direct memory access controller circuit configured to control the transportation of trace data information from the one or more memory circuits to the trace data information port.

Furthermore, in various embodiments, an integrated circuit is provided. The integrated circuit may include a direct memory access controller circuit; one or more information processing circuits configured to process trace data information relating to a series of instructions; one or more memory circuits configured to store the trace data information; wherein the direct memory access controller circuit is configured to manage a transport channel configured to transport trace data information to or from the one or more information processing circuits and from the one or more memory circuits to a trace data information port.

In various embodiments, an integrated circuit is provided. The integrated circuit may include one or more information processing circuits configured to process trace data information relating to a series of instructions; one or more memory circuits configured to store a first portion of trace data information relating to a series of instructions and a second portion of trace data information; a direct memory access controller circuit configured to manage the transportation of the first portion of trace data information to or from the one or more information processing circuits and the transportation of the second portion of trace data information to a trace data information port.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Inventors have determined that the cost and performance trends indicating the cost of bandwidth per pin compared to the number of processor cores which may be implanted per chip are persistent and the trends are unlikely to be reversed. Therefore, future solutions could offer the option of on-chip and off-chip tracing. Future solutions for on- and off-chip tracing will try to combine the advantages and effects of the on-chip and off-chip tracing, while keeping costs at an acceptable level.

Figure 1:
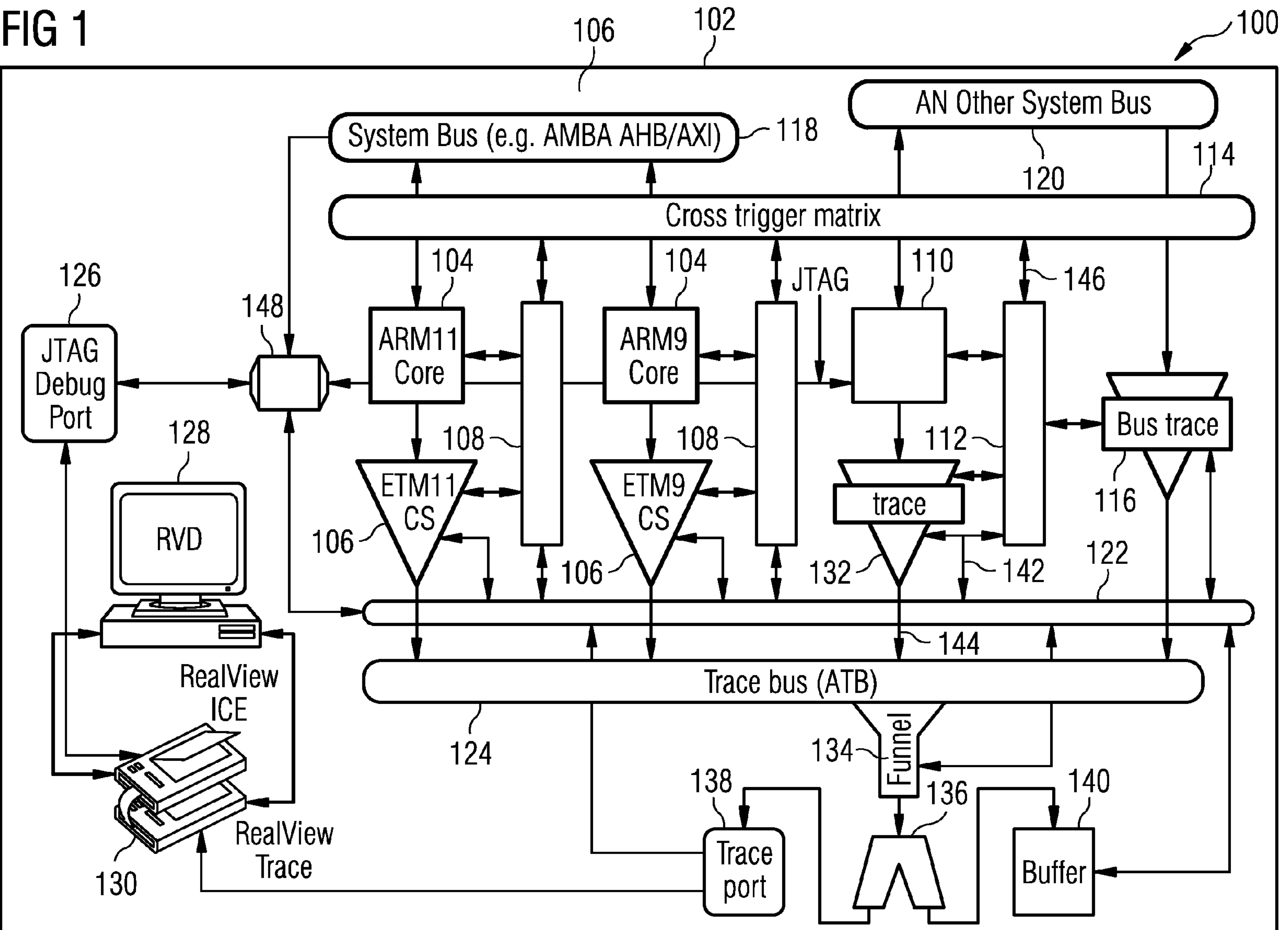
FIG. 1 shows an illustration of a system-on-chip (SOC) architecture from an ARM CoreSight™ library.

FIG. 1 shows an illustration 100 of a system-on-chip (SOC) 102 architecture in accordance with various embodiments, using an ARM CoreSight™ library, which offers both options of on-chip and off-chip tracing. The system-on-chip architecture 102 may include one or more processor cores 104, 110, e.g. an ARM 11 or ARM 9 processor core. The one or more processor cores 104, 110 may form part of a central processing unit CPU, such as a CPU of a computer. The processor cores 104, 110 may execute a series of instructions. The series of instructions may include information related to process identifier information, data information, status information and watch point information. The series of instructions may be related to a program. Trace data information may be data information related to the said series of instructions aforementioned. The processor cores may be sources of trace data information. Each processor core 104, 110 may be arranged to be in connection with a trace data information monitoring circuit 106, 132. The trace data information monitoring circuit 106, 132 may be for example an embedded trace macrocell, which may be configured to monitor a series of instructions from a processor core and to generate trace data information related to the series of instructions from a processor core. In various embodiments, one of a plurality of processor cores 104, 110 may be arranged to each be in connection with one of a plurality of trace data information monitoring circuits 106, 132, e.g. an embedded trace macrocell.

Buses may also be sources of trace data information. For example, bus 120 may be a bus trace data information source. The bus trace data information may be received by a bus trace data information monitoring circuit 116, which may be configured to be in connection with the bus 120 and to generated trace data information from the bus from monitoring a series of instructions executed by the bus. Bus 120 may be a system bus.

A trace data information monitoring circuits 106, 132, 116 may be a circuit configured to listen to or to monitor trace data information sources 104, 110, 120 for a series of instructions related to the functions and executions of the trace data information source 104, 110, 120. The trace data information monitoring circuit 106, 132, 116 may be configured to generate trace data information relating to the series of instructions from the trace data information source 104, 110, 120.

Data information for on-chip debugging may be configured to be transmitted to an on-chip debug port, such as a debug access port 148 from a trace data information monitoring circuit 106, 132, 116 which may be connected to a trace data information source 104, 110, 120 via a debug bus 122.

The system-on-chip may also include an on-chip cross trigger matrix 114 and cross trigger interfaces 108, 112 for providing information related to the debug and trace between each of the processor cores 104, 110, and between each of the processor cores 104, 110 and each of the trace sources, e.g. bus trace sources 116.

A trace data information monitoring circuit 132, 106, 116 may be connected to the trace bus 124 and/or a debug bus 122 via a standard debug interconnect interface. By way of example, trace data information monitoring circuit 132 may be connected to debug bus 122 via standard debug interconnect interface 142. By way of example, trace data information monitoring circuit 132 may be connected to trace bus 124 via standard debug interconnect interface 144. Trace data information monitoring circuit 132, 106, 116 may be connected to a cross-triggering interface 108, 112 via a standard debug interconnect interface. In various embodiments, trace data information monitoring circuit 132 may be connected to cross-triggering interface 112 via standard debug interconnect interface 142. A cross-triggering interface 108, 112 may be connected to a cross trigger matrix 114 via a standard debug interconnect interface. In various embodiments, cross-triggering interface 112 may be connected to cross trigger matrix 114 via standard debug interconnect interface 146.

Trace data information from the trace data information monitoring circuits 106, 132, 116 may be transmitted via a trace bus 124. In various embodiments, trace bus 124 may be used for the transportation of trace data information associated with system signals within a chip. The trace data information may be transmitted through a funnel 134. The replicator 136 may allow the trace data information to be directed to two data information sinks. Trace data information to be sent to an on-chip debug access port 148, e.g. a single debug access port, may be first stored in a buffer circuit 140 before being transmitted via a transport channel, e.g. a debug bus 122 to the on-chip debug access port.

Trace data information to be sent to an off-chip trace analyzer 130 may be transmitted directly from a trace data information monitoring circuit 132, 106, 116 to a trace port 138, that is, trace data information to be sent to an off-chip trace analyzer 130 may be transmitted directly to a trace port 138 without being stored in a memory circuit or a buffer circuit. The trace data information transmitted through the trace port 138 may be analyzed by an off-chip trace analyzer 130, e.g. a Realview trace analyzer, or may be processed by an off-chip debugger 128, such as a Realview debugger. The off-chip trace analyzer 130 may be configured to be in connection with an on-chip debug port, such as a JTAG debug port, which may also be connected to the debug access port. It is to be noted that any other suitable debug port may be provided in alternative embodiments.

Therefore, trace data information intended for the off-chip processing, e.g. processing by an off-chip trace data analyzer 130 may be transmitted via a trace data information port 138 configured to be in connection with the trace data analyzer 130 without being stored in a memory circuit or a buffer circuit. Trace data information intended for on-chip processing may be stored in a buffer memory 140 before being transmitted via an on-chip bus to an on-chip processor circuit.

With the system-on-chip architecture in FIG. 1, trace data information for off-chip tracing may be transmitted to the trace port 138, without being qualified. The bandwidth of the trace data information may often be too high to be transmitted through the trace port 138, which means that high bandwidth per pin still is an issue. Furthermore, peaks in the bandwidth may lie beyond the capacity of the trace port 138.

Furthermore, the trace data information port 138 is a bandwidth bottleneck, and pin-based port with a medium level trace bandwidth. Therefore, the trace data information 138 may not have the capacity to output both data content and address trace data information. The trace data information port 138 may be limited to output low bandwidth information, e.g. just compressed instruction pointer trace data information and not both address and data access information. That is, compressed instruction pointer trace formation may output low bandwidth information, e.g. just a trace message, when there is a branch, wherein the message contains the number of sequential instructions since the last branch and the branch target address.

However if the trace data information is qualified, e.g. if data accesses are filtered to be only within a certain range or to be of a certain function, the average bandwidth may be configured to lie easily within the capabilities of the trace data information port 408.

According to various embodiments, a buffer circuit may be configured to equal out trace bandwidth peaks. According to various embodiments, a direct memory access controller may be configured to move trace data from the buffer to the trace port over an on-chip bus. As the funnel 134, trace port 138 and buffer circuit 140 may share resources, therefore it is proposed to combine on-chip trace buffer circuit and trace port resources in a flexible way.

Figure 2:
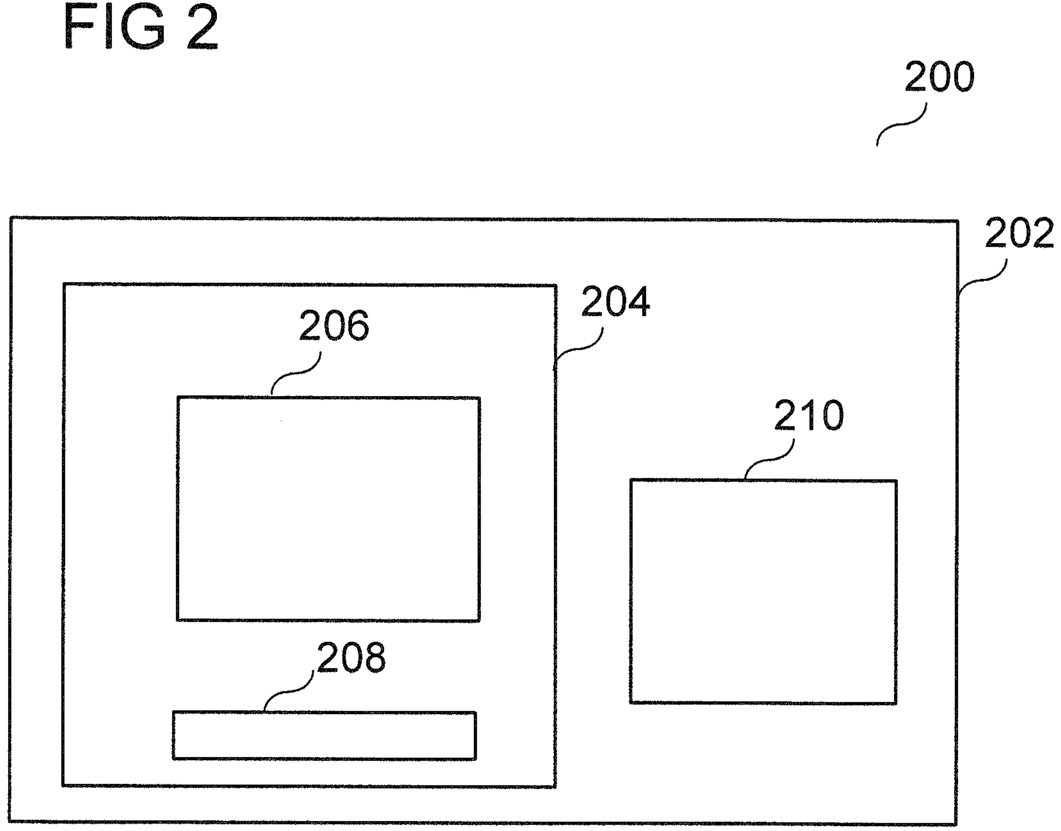
FIG. 2 shows an arrangement for processing trace data information in accordance with various embodiments.

FIG. 2 shows an illustration 200 of an arrangement 202 for processing trace data information according to various embodiments. The arrangement 202 includes a chip 204 including one or more memory circuits 206 configured to store trace data information relating to a series of instructions, and a trace data information port 208 configured to provide off-chip access to the trace data information. The arrangement may further include a direct memory access controller circuit 210 configured to control the transportation of trace data information from the one or more memory circuits 206 to the trace data information port 208. The arrangement 202 may form part of a greater system-on-chip arrangement. The trace data information relating to a series of instructions may be executed by a program, e.g. the trace data information could be from processor signals such as process identifier signals, program signals, data signals, status signals, watch point signals; or bus signals such as bus status signals or bus watch point signals or general status signals.

Figure 3:
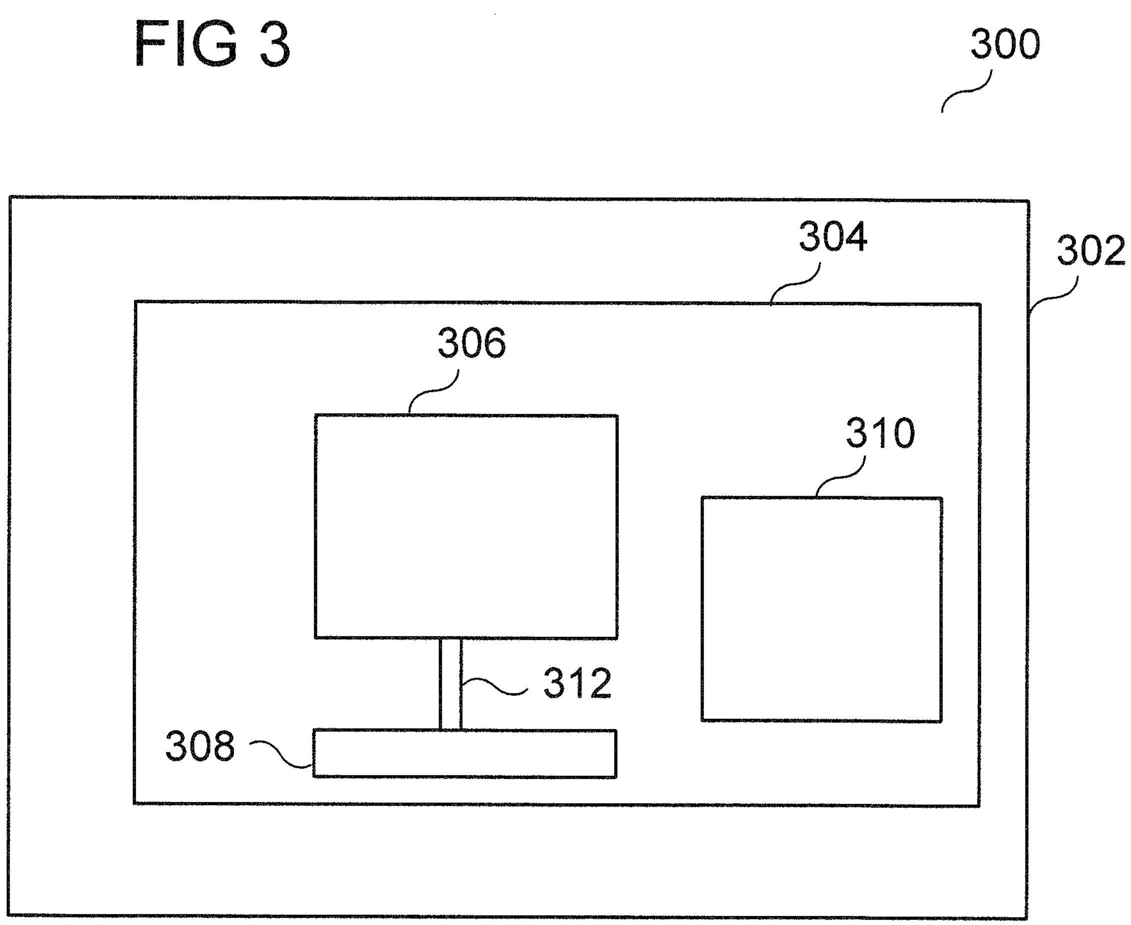
FIG. 3 shows an arrangement for processing trace data information in accordance with various embodiments.

FIG. 3 shows an illustration 300 of an arrangement 302 for processing trace data information according to various embodiments. The arrangement 302 includes a chip 304 including one or more memory circuits 306 configured to store trace data information relating to a series of instructions, and a trace data information port 308 configured to provide off-chip access to the trace data information. The arrangement 302 further includes a direct memory access controller circuit 310 configured to control the transportation of trace data information from the one or more memory circuits 306 to the trace data information port 308. The direct memory access controller circuit 310 and the trace data information port 308 may be arranged on the same chip. The direct memory access controller circuit 310 may be configured to control a transport channel 312 for the transportation of trace data information from the one or more memory circuits 306 to the trace data information port 308 based on information related to the trace data information port 308. The arrangement 302 may form part of a greater system-on-chip arrangement such as that of FIG. 1 and which will be further described with respect to FIG. 8.

Figure 4:
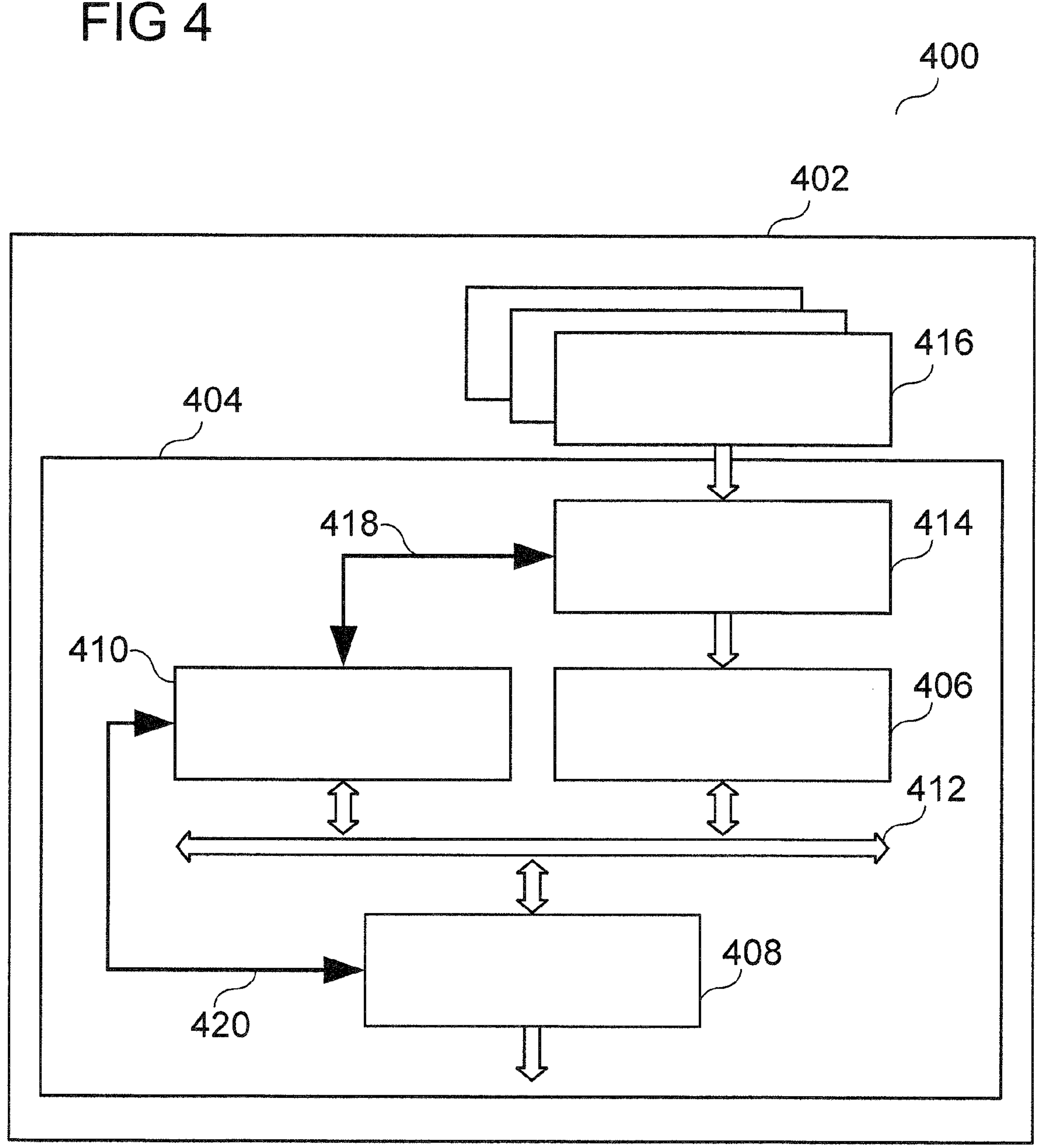
FIG. 4 shows an arrangement for processing trace data information in accordance with various embodiments.

FIG. 4 shows an illustration 400 of an arrangement 402 for processing trace data information according to various embodiments. The arrangement 402 includes a chip 404 including one or more memory circuits 406 configured to store trace data information relating to a series of instructions, and a trace data information port 408 configured to provide off-chip access to the trace data information. The arrangement 402 further includes a direct memory access controller circuit 410 configured to control the transportation of trace data information from the one or more memory circuits 406 to the trace data information port 408. The direct memory access controller circuit 410 and the trace data information port 408 may be arranged on the same chip. The direct memory access controller circuit 410 may be configured to control a transport channel 412 for the transportation of trace data information from the one or more memory circuits 406 to the trace data information port 408 based on information related to the trace data information port 408.

The one or more memory circuits 406, e.g. an on-chip trace data information buffer circuit and the trace data information port 408 resources may be combined in a flexible way: Instead of outputting trace data information directly to the trace data information port 408, the trace may always be written into one or more memory circuits 406, e.g. a trace data information buffer circuit, from which the trace data information can be moved with a trace direct memory access controller circuit 410 to the trace data information port 408. The direct memory access controller circuit 410 may be configured to control the transfer of trace data information from the one or more memory circuits 406 to the trace data information port 408, from where it is output over chip/package pins.

In various embodiments, the direct memory access controller circuit 410 may be configured to move trace data information from the one or more memory circuits 406 to the trace data information port 408, when it is determined that trace data information is available in the one or more memory circuits 406 and that trace data information can be received by the trace data information port 408.

In various embodiments, the direct memory access controller circuit 410 may be configured to process memory circuit address information related to the write location of trace data information into the one or more memory circuits 406.

In various embodiments, the direct memory access controller circuit 410 may be configured to control a transport channel 412 for the transportation of trace data information from the one or more memory circuits 406 to the trace data information port 408 based on information related to the trace data information port 408.

In various embodiments, the transport channel 412 may include an on-chip bus.

In various embodiments, the transport channel 412 may include an address bus.

In various embodiments, the transport channel 412 may include a control bus.

In various embodiments, the transport channel 412 may include a dedicated on-chip debug bus.

In various embodiments, the direct memory access controller circuit 410 may be configured to use the write address information related to the write location of trace data information into the one or more memory circuits 406 to control the regular on-chip bus 412.

In various embodiments, the arrangement 402 may further include one or more trace data information monitoring circuits 414 configured to be in connection with the one or more memory circuits 406, wherein the trace data information received by the one or more trace data information monitoring circuits 414 may be stored in the one or more memory circuits 406.

In various embodiments, the direct memory access controller circuit 410 may be configured to receive from the one or more trace data information monitoring circuits 414 the memory circuit write address information related to the write location of trace data information into the one or more memory circuits 406.

In various embodiments, the one or more trace data information monitoring circuits 414 may be configured to monitor one or more trace data information sources 416 to receive trace data information.

In various embodiments, the direct memory access controller circuit 410 and the one or more trace data information sources 416 may be arranged on the same chip.

In various embodiments, the one or more memory circuits 406 may include a circular buffer circuit.

In another embodiment, the one or more memory circuits 406 may include a trace emulation memory circuit TMEM.

Tracing may always be done to an on-chip one or more memory circuits 406 e.g. a buffer circuit, independent from whether it is operating in single-shot or continuous mode. A direct memory access controller, channel or circuit or a dedicated trace direct memory access controller circuit or channel 410 may move the trace data from the one or more memory circuits 406, e.g. a buffer circuit, to the trace data information port 408 over a transport channel 412, e.g. an on-chip bus 412 or a dedicated debug bus 412. This may allow for very flexible output of trace data over different interfaces.

In various embodiments, the trace data information port 408 may be a pin-based port with a medium level trace bandwidth. The trace port may be operated in a very flexible manner for hardware and instrumentation trace. Different trace port options may be used, e.g. MIPI trace ports, or a trace port overlaid to USB user interface.

In various embodiments, the trace data information port 408 is a pin-based Mobile Industry Processor Interface (MIPI) port, e.g. a 5-pin MIPI trace interface, mainly used for SW/instrumentation trace.

In various embodiments, the trace data information port may output a highly compressed instruction pointer (IP) trace data information, e.g. absolute, relative and subroutine IP trace data information, of a single core processor 416.

In various embodiments, the trace data information port 408 may be connected to a USB user interface.

The trace data information port 408 interface may be chosen according to the need and requirements of the chip 404.

In various embodiments, the trace data information relating to a series of instructions includes instruction pointer information.

In various embodiments, the trace data information relating to a series of instructions further includes data access information related to the series of instructions.

In various embodiments, the trace data information port may output a qualified trace data information related to the full data content of trace data information.

In various embodiments, the trace data information port may output a qualified and/or compressed trace data information related to the full data content of trace data information.

In various embodiments, the series of instructions may be related to a program

The direct memory access controller circuit 410 may be configured to only move trace data information, when available trace data information is available in the one or more memory circuits 406 and an input memory or buffer circuit of the trace data information port 408 is empty. The direct memory access controller circuit 410 may be configured to control the transfer of trace data information from the one or more memory circuits 406 to the trace data information port 408 when it is indicated by the status information or status signal from the trace data information port 408 that available memory is available. This is indicated by the status and control signals 420 shown in FIG. 4.

For controlling the transfer of trace data information from the one or more memory circuits 406 to the trace data information port 408, the direct memory access controller circuit 410 may require information about the current buffer write address of the one or more trace data information monitoring circuits 414. The direct memory access controller circuit 410 may be configured to control status signal information of the one or more trace data information monitoring circuits 414. This is indicated by the status and control signals 418 shown in FIG. 4.

The basic functionalities of the features described with respect to FIGS. 2,3 and 4 will be referred to and are applicable throughout all the various embodiments which will be described in more detail below.

Figure 5:
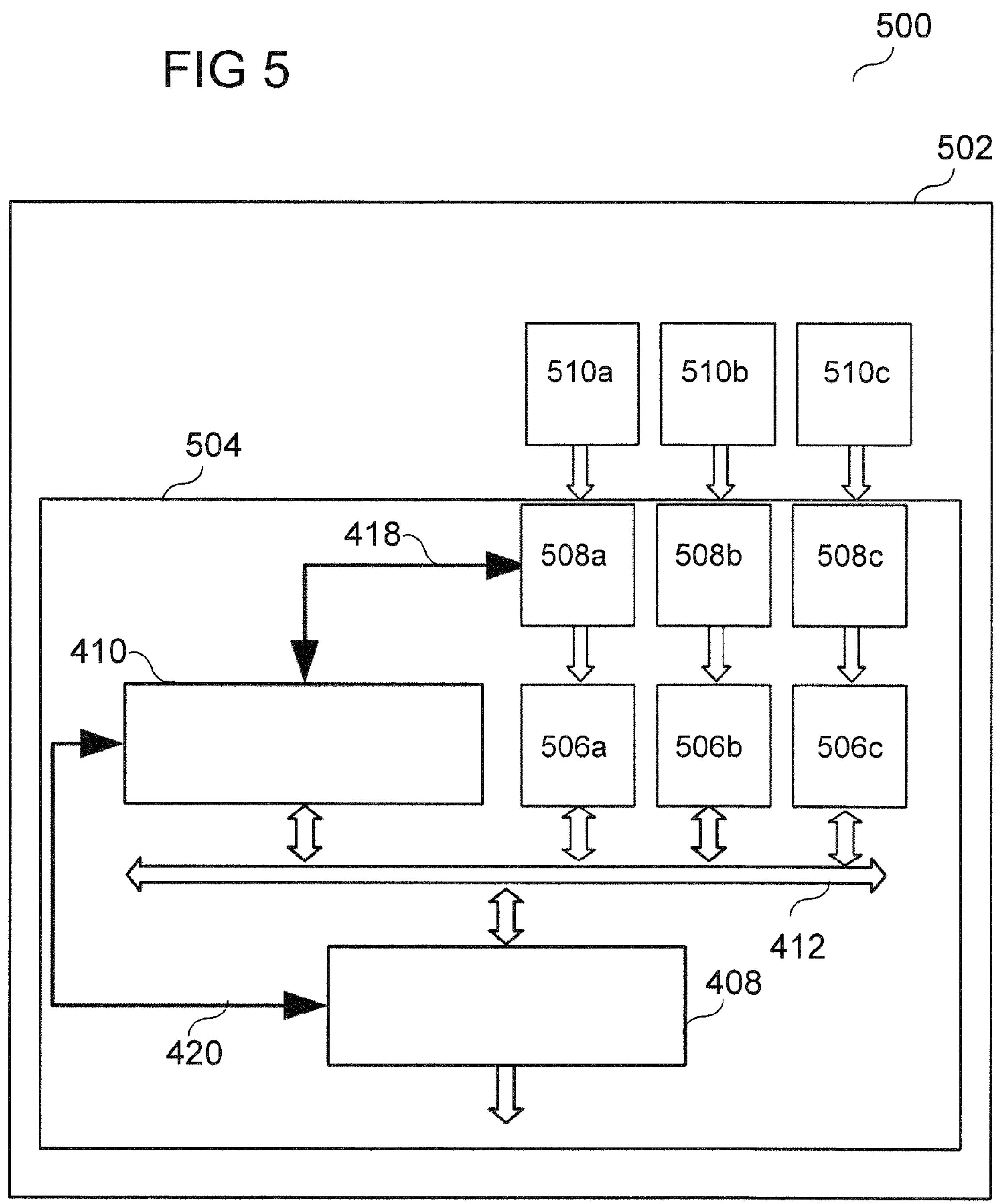
FIG. 5 shows an arrangement for processing trace data information in accordance with various embodiments.

FIG. 5 shows an illustration 500 of an arrangement 502 for processing trace data information according to an embodiment. Identical features as to those described in FIG. 4 are denoted with the same reference signs. The arrangement 502 includes a chip 504 including the direct memory access controller circuit 410, the transport channel 412 and the trace data information port 408 described in FIG. 4.

The arrangement 502 may include one or more trace data information monitoring circuits 508*a*, 508*b*, 508*c* configured to be in connection with the one or more memory circuits 506*a*, 506*b*, 506*c*, wherein the trace data information received by the one or more trace data information monitoring circuits 508*a*, 508*b*, 508*c* may be stored in the one or more memory circuits 506*a*, 506*b*, 506*c*.

In an embodiment, at least one of the one or more trace data information monitoring circuits 508*a*, 508*b*, 508*c* may be configured to be coupled to a pre-determinedly selected one or more memory circuits 506*a*, 506*b*, 506*c*, e.g. trace data information monitoring circuit 508*a* may be configured to be coupled to pre-determinedly selected memory circuit 506*a*, such that trace data information received by the at least one of the one or more trace data information monitoring circuits 508*a*, 508*b*, 508*c* may be stored in the pre-determinedly selected one or more memory circuits 506*a*, 506*b*, 506*c* (e.g. trace data information received by trace data information monitoring circuit 508*a* may be stored in the pre-determinedly selected memory circuit 506*a*).

In various embodiments, at least one of the one or more trace data information monitoring circuits 508*a*, 508*b*, 508*c* may be configured to be coupled to a pre-determinedly selected one or more trace data information sources 510*a*, 510*b*, 510*c*, such that trace data information received by the at least one of the one or more trace data information monitoring circuits 508*a*, 508*b*, 508*c* from the pre-determinedly selected one or more trace data information sources 510*a*, 510*b*, 510*c* may be stored in the pre-determinedly selected one or more memory circuits 506*a*, 506*b*, 506*c*. For example, trace data information monitoring circuit 508*a* may be configured to be coupled to pre-determinedly selected trace data information source 510*a*. Trace data information received by the trace data information monitoring circuit 508*a* from the pre-determinedly selected trace data information source 510*a* may be stored in the pre-determinedly selected memory circuit 506*a*. Similarly, trace data information monitoring circuits 508*b* may be configured to be coupled to pre-determinedly selected trace data information source 510*b*. Trace data information received by the trace data information monitoring circuit 508*b* from the pre-determinedly selected trace data information source 510*b* may be stored in the pre-determinedly selected memory circuit 506*b*.

The one or more trace data information monitoring circuits 508*a*, 508*b*, 508*c* allows for the observation of one or several processor cores or other trace sources, e.g. processors, bus, signals 510*a*, 510*b*, 510*c*. The one or several processor cores 510*a*, 510*b*, 510*c* may be arranged in a central processing unit (CPU).

The one or more trace data information monitoring circuits 508*a*, 508*b*, 508*c* may be configured to be coupled to a pre-determinedly selected one or more memory circuit 506*a*, 506*b*, 506*c*, wherein each pre-determinedly selected one or more memory circuit 506*a*, 506*b*, 506*c*, may be configured to be coupled to a transport channel 412, e.g. an on-chip bus, for reading out and/or transporting trace data information.

Therefore, several trace data information monitoring unit/memory circuit pairs, e.g. 508*a*/506*a*, 508*b*/506*b*, 508*c*/506*c* for different sets of processor cores or trace data information sources 510*a*, 510*b*, 510*c* within the system-on-chip may be formed.

In another embodiment, the direct memory access controller circuit 410 may be configured to determine whether trace data information may be transported from the one or more memory circuits 406, 506*a*, 506*b*, 506*c* to the trace data information port 408 based on information related to the trace data information port 408, e.g. depending on whether an input buffer to the trace data information port 408 is full.

In various embodiments, the one or more memory circuits 406, 506*a*, 506*b*, 506*c* may further include a first-in-first-out FIFO counter. The FIFO counter may be controlled by a direct memory access controller circuit 410, and may be configured to respond to or be in connection with a direct memory access controller circuit 410 wherein the direct memory access controller circuit 410 is a smart direct memory access controller requester circuit. The direct memory controller circuit 410 may process information related to the capacity of the one or more memory circuits 406, 506*a*, 506*b*, 506*c*.

In various embodiments, the direct memory access controller circuit 410 may control the incrementing of a counter, e.g. a FIFO counter, related to the one or more memory circuits 406, 506*a*, 506*b*, 506*c*. The counter may be configured to increase by a pre-determined amount, e.g., 2, for trace data information of a pre-determined data width, e.g. 64 bits, to be written or written to the one or more memory circuits 406, 506*a*, 506*b*, 506*c*, wherein the trace data information may be transmitted to the one or more memory circuits 406, 506*a*, 506*b*, 506*c* from a trace data information monitoring circuits 414 508*a*, 508*b*, 508*c*.

In various embodiments, the direct memory access controller circuit 410 may create direct memory access requests to the one or more memory circuits 406, 506*a*, 506*b*, 506*c*.

In various embodiments, the direct memory access controller circuit 410 may control the decrement of a counter, e.g. a FIFO counter in relation to reads by the direct memory access controller circuit 410. For example, the direct memory access controller circuit 410 may decrement a counter, e.g. a FIFO counter by half for 32 or 64 bit reads by the direct memory access controller circuit 410.

In various embodiments, the direct memory access controller circuit 410 may be configured to determine the amount of trace data information that may be stored in the one or more memory circuits 406, 506*a*, 506*b*, 506*c* based on information related to the one or more memory circuits 406, 506*a*, 506*b*, 506*c*, e.g. based on the amount of space available for storage in the one or more memory circuits 406, 506*a*, 506*b*, 506*c*, or based on whether the one or more memory circuits 406, 506*a*, 506*b*, 506*c* has reached its storage maximum capacity. In various embodiments, if a FIFO counter related to the one or more memory circuits becomes full, for example if a counter threshold is reached, the direct memory access controller circuit 410 may raise a suspend and/or trigger signal.

In various embodiments, the counter can also be used for tool reads via a bus master module, e.g. Cerberus. This bus master can be remote controlled by a debug tool and allows to read the trace memory content. If the tool connection supports very fast block reads, this approach may even allow continuously transmitting the trace data without the need for any kind of trace pins. With this approach it is even possible to repeat the transmission of a trace data block in case of transmission errors.

In various embodiments, the tool reads counter value again when the previous FIFO data was read leading to a minimum less than 1% communication overhead.

In various embodiments, the direct memory access controller circuit 410 may have its own write signature signal to indicate that trace data information is to be written to one or more memory circuits 406, 506*a*, 506*b*, 506*c*, for e.g. a start of frame signal over a serial connection to indicate a restart of transmission of trace information data to the one or more memory circuits 406, 506*a*, 506*b*, 506*c*. This start of frame information is needed for the decompression of compressed trace data. Without such markers it would be impossible to resume trace decoding e.g. after transmission errors.

In various embodiments, the one or more trace data information monitoring circuits 414, 508*a*, 508*b*, 508*c* may be configured to respond to the suspend and/or trigger signal raised by the direct memory access controller circuit 410. In various embodiments, the one or more trace data information monitoring circuits 414, 508*a*, 508*b*, 508*c* may be configured to regulate the amount of bandwidth occupied by the received trace data information from a lower bandwidth mode to a higher bandwidth mode or from a higher bandwidth mode to a lower bandwidth mode based on information related to the one or more memory circuits 406, 506*a*, 506*b*, 506*c* when receiving the direct memory access controller circuit 410 suspend and/or trigger signal. The one or more memory circuits 406, 506*a*, 506*b*, 506*c*, e.g. buffer circuits may be configured to equal out trace bandwidth peaks.

In various embodiments, the one or more trace data information monitoring circuits 414, 508*a*, 508*b*, 508*c* may be configured to disable their connection to the one or more trace data information sources 416, 510*a*, 510*b*, 510*c* based on information related to the one or more memory circuits 406, 506*a*, 506*b*, 506*c*, for example, in response to a suspend or trigger signal raised by the direct memory access controller circuit 410.

In various embodiments, the direct memory access controller circuit 410 may be configured to control the trace data information monitoring circuits 414, 508*a*, 508*b*, 508*c*. The trace data information monitoring circuits 414, 508*a*, 508*b*, 508*c* may be configured to respond to a direct memory access controller circuit 410 signal such as the aforementioned suspend and/or trigger signal by having a smart trace bandwidth reduction mechanism, which e.g. switches trace data information sources from a more accurate to a higher compression mode (e.g. cycle accurate to compressed IP trace, disabling data trace address windows, only data addresses instead of data addresses and values, etc.), or switches trace data information monitoring circuits 414, 508*a*, 508*b*, 508*c* sources off completely with a given priority sequence when the one or more memory circuits 406, 506*a*, 506*b*, 506*c*, .e.g. a buffer fill level is close to full.

In various embodiments, the large buffer circuits may be configured to equalize and smooth the trace bandwidth peaks, which allows for qualified trace data information to be output via the trace data information port 408. The direct memory access controller circuit 410 may be configured to determine the buffer level in the one or more memory circuits 406, 506*a*, 506*b*, 506*c* and may also be configured to adapt the trace data information qualification parameters set in the one or more trace data information monitoring circuits 414, 508*a*, 508*b*, 508*c* for setting the criteria for a qualified trace data information, which may be used by the one or more trace data information monitoring circuits 414, 508*a*, 508*b*, 508*c* to regulate the amount of bandwidth occupied by the received trace data information.

According to the embodiments described with respect to FIG. 4 and FIG. 5, the features: one or more trace data information monitoring circuits 414, 508*a*, 508*b*, 508*c*, the one or more trace data information sources 416, 510*a*, 510*b*, 510*c*, the direct memory access controller circuit 210, 310, 410, the transport channel 312, 412, the trace data information port 208, 308, 408, the one or more memory circuits 206, 306, 406, 506*a*, 506*b*, 506*c*, may be formed on the same chip. According to an embodiment, one or more of the features may be formed off-chip.

The basic functionalities of the features described with respect to FIG. 5 will be referred to in FIGS. 6 and 7 and are applicable throughout all the various embodiments described in this document and to the embodiments which will be described in more detail below.

Figure 6:
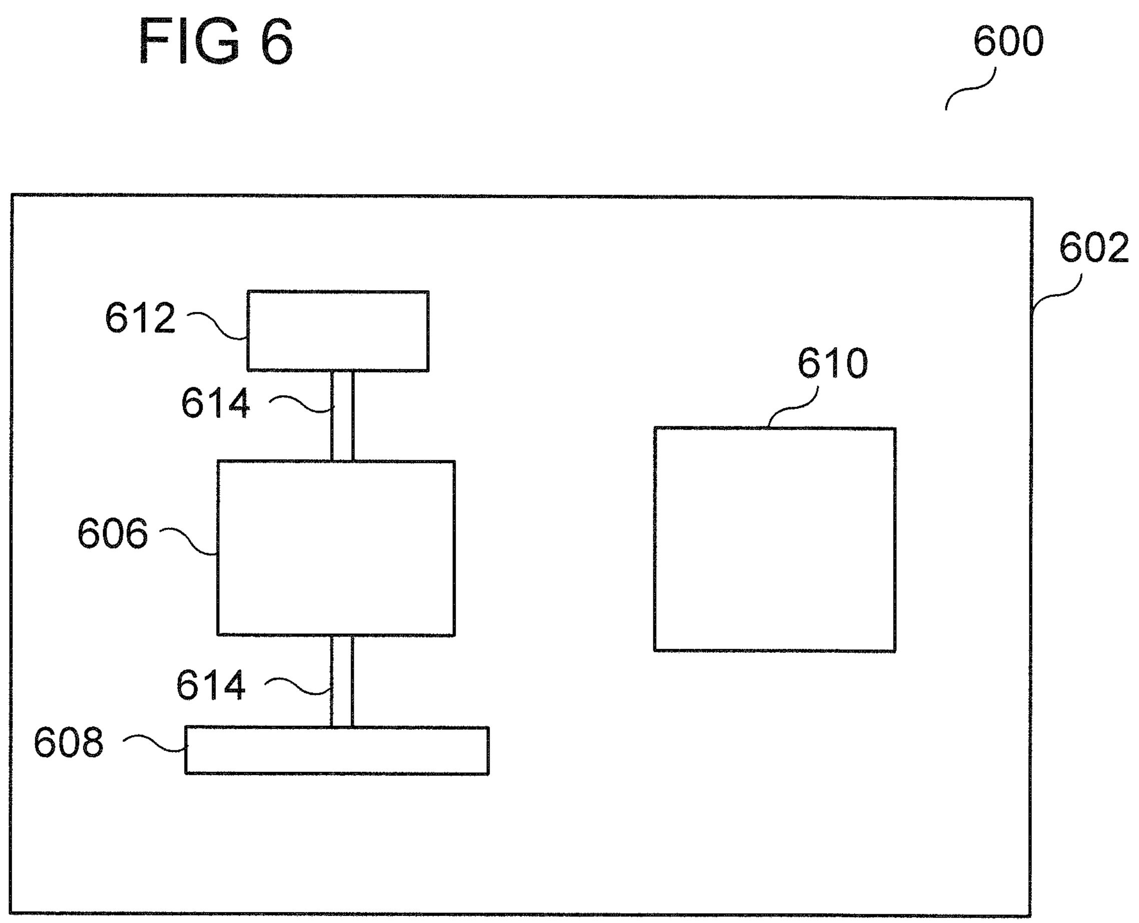
FIG. 6 shows an integrated circuit arrangement in accordance with various embodiments.

FIG. 6 shows an illustration 600 of an integrated circuit 602 according to various embodiments. The integrated circuit 602 may be configured to process trace data information. The integrated circuit 602 may include a direct memory access controller circuit 610; one or more information processing circuits 612 configured to process trace data information relating to a series of instructions; one or more memory circuits 606 configured to store the trace data information; wherein the direct memory access controller circuit 610 is configured to manage a transport channel 614 configured to transport trace data information to or from the one or more information processing circuits 612 and from the one or more memory circuits 606 to a trace data information port 608. The one or more information processing circuits 612 may include an on-chip debugging information processing circuit. A direct memory access controller circuit 610 may be used to control a transport channel 614, e.g. an on-chip bus or a debug bus, wherein the transport channel 614 may be configured to transport trace data information to or from on-chip debugging information processing circuits 612, or between on-chip debugging information processing circuits 612, as well as from the one or more memory circuits 606 to a trace data information port 608 for off-chip tracing, resulting in an efficient use of on-chip debugging resources for off-chip tracing.

In various embodiments, the integrated circuit 602 may include one or more information processing circuits 612 configured to process trace data information relating to a series of instructions; one or more memory circuits 606 configured to store a first portion of trace data information relating to a series of instructions and a second portion of trace data information; a direct memory access controller circuit 610 configured to manage the transportation of the first portion of trace data information to or from the one or more information processing circuits 612 and the transportation of the second portion of trace data information to a trace data information port 608. All trace data information for on-chip debugging, e.g. by one or more information processing circuits 612, and trace data information to be transported to an off-chip debugging circuit may be stored in the one or more memory circuits 606.

The one or more memory circuits 606 may include the one or more memory circuits already described with respect to FIGS. 2 to 5. The integrated circuit 602 may further include the one or more trace data information monitoring circuits 414, 508*a*, 508*b*, 508*c* and the one or more trace data information sources 416, 510*a*, 510*b*, 510*c* already described with respect to FIGS. 4 and 5, and which are not shown in FIG. 6 but may be connected to features of integrated circuit 602 according to configurations and functions of the features already described with respect to FIGS. 4 and 5, and will not be further described here for the sake of brevity.

The basic functionalities of the features described with respect to FIGS. 5 and 6 will be referred to and are applicable throughout all the various embodiments which will be described in more detail below.

Figure 7:
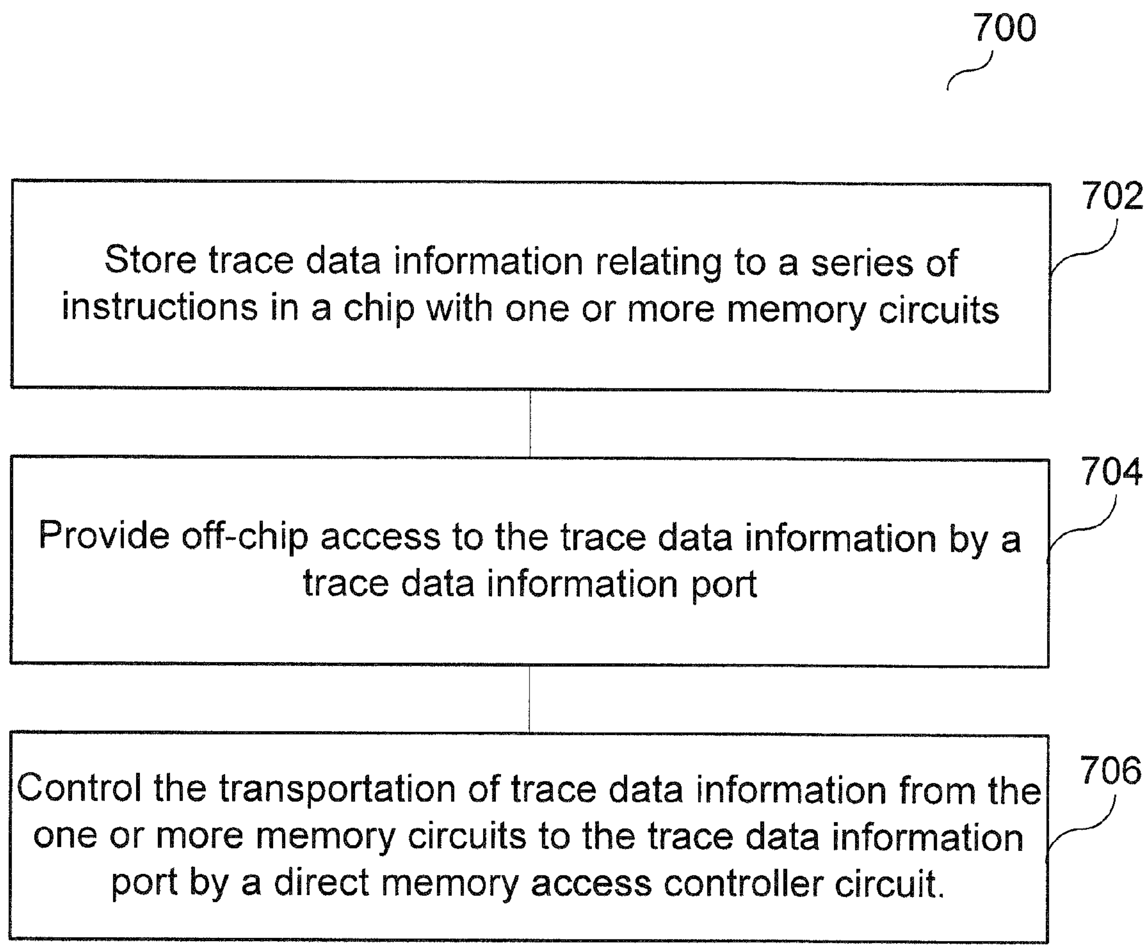
FIG. 7 shows a method for processing trace data information in accordance with various embodiments.

FIG. 7 shows an illustration 700 of a method for processing trace data information according to various embodiments. The method may include the step 702 of storing trace data information relating to a series of instructions, in a chip with one or more memory circuits; the step 704 of providing off-chip access to the trace data information by a trace data information port; and the step 706 of controlling the transportation of trace data information from the one or more memory circuits to the trace data information port by a direct memory access controller circuit.

Figure 8:
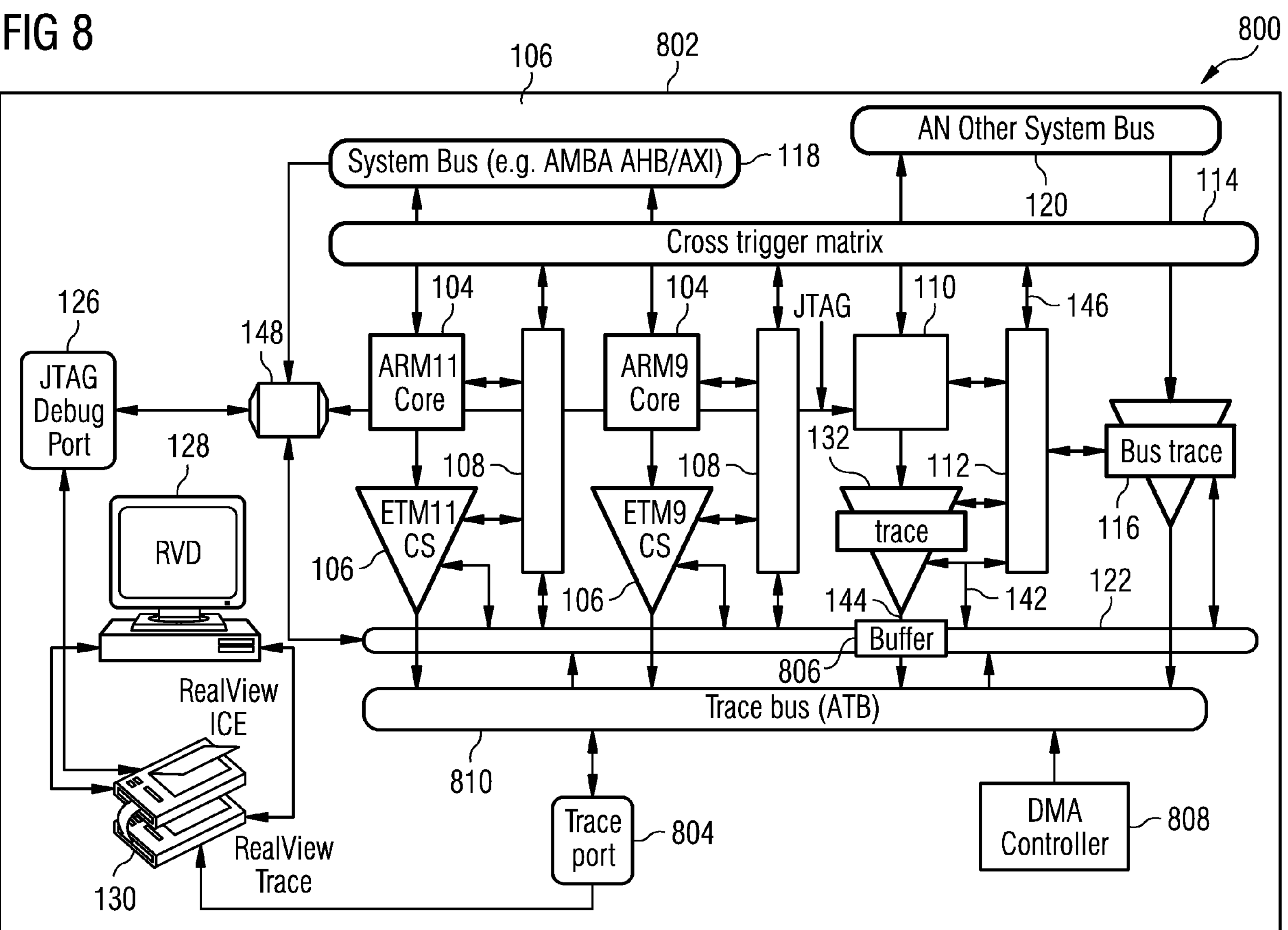
FIG. 8 shows a system-on-chip arrangement for processing trace data information in accordance with various embodiments.

FIG. 8 shows an illustration 800 of a system-on-chip arrangement 802 for processing trace data information. In various embodiments, the system-on-chip arrangement 802 may include the features and components already described with respect to the system-on-chip arrangement 102 disclosed in FIG. 1. Identical features as to those described in FIG. 1 are denoted with the same reference signs. The system-on-chip arrangement 802 may include one or more trace data information sources 104, 110,120, e.g. processor cores, a cross trigger matrix 114, a cross trigger interface 108, a system bus 120, an on-chip debug bus 122, a trace data information bus 810, a debug port 126 such as a JTAG debug port, a debug access port 148, e.g. a single debug access port, standard debug interfaces 142, 144, 146, and trace data information monitoring circuits 106, 132, 116, already described with reference to FIG. 1.

According to various embodiments, the arrangement 802 may further include one or more memory circuits 806 configured to store trace data information relating to a series of instructions, and a trace data information port 804 configured to provide off-chip access to the trace data information. The arrangement 802 may further include a direct memory access controller circuit 808 configured to control the transportation of trace data information from the one or more memory circuits 806 to the trace data information port 804. The direct memory access controller circuit 808 may be configured to control a transport channel 810 for the transportation of trace data information from the one or more memory circuits 806 to the trace data information port 804 based on information related to the trace data information port 804.

The trace data information port 804 may be connected to off-chip trace data information analyzer 130, already described with respect to FIG. 1 and which will not be described here for the sake of brevity.

According to various embodiments, the trace data information monitoring circuit 106, 132, 116 may be a trace data information monitoring circuit as described previously with respect to the trace data information monitoring circuit of 414, 508*a*, 508*b*, 508*c* of FIGS. 4 and 5.

According to various embodiments, the one or more memory circuits 806 may be one or more memory circuits as described previously with respect to the one or more memory circuits 206, 306, 406, 506*a*, 506*b*, 506*c*, 606 of FIGS. 2, 3, 4, 5 and 6.

According to various embodiments, the trace data information port 804 may be a trace data information port as described previously with respect to the trace data information port 208, 308, 408, 608 of FIGS. 2, 3, 4, 5 and 6.

According to various embodiments, the direct memory access controller circuit 808 may be a direct memory access controller circuit as described previously with respect to the direct memory access controller circuit 210, 310, 410, 610 of FIGS. 2, 3, 4, 5 and 6.

According to various embodiments, the transport channel 810 may be a transport channel as described previously with respect to the transport channel 312, 412, 614 of FIGS. 2, 3, 4, 5 and 6.

According to various embodiments, the transport channel transport channel 810, e.g. a trace bus, may be the same channel as the transport channel 122 e.g. debug bus described previously with respect to the transport channel of FIG. 1. The direct memory access controller circuit 808, may control a transport channel 810 which may be configured to perform the role of a debug bus and trace data information bus for debug and trace data information According to various embodiments, the one or more trace data information sources 104, 110, 116 may be the trace data information sources described previously with respect to the trace data information source 416, 510*a*, 510*b*, 510*c* of FIGS.4 and 5.

According to various embodiments, the trace data information may be monitored by software running on a CPU.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An arrangement for processing trace data information, the arrangement comprising, a chip comprising one or more memory circuits configured to store trace data information relating to a series of instructions, and a trace data information port configured to provide off-chip access to the trace data information;

one or more trace data information monitoring circuits configured to be in connection with the one or more memory circuits;

wherein the trace data information port is connected via an on-chip bus to the trace data information monitoring circuits; and a direct memory access controller circuit configured to control the transportation of trace data information from the one or more memory circuits to the trace data information port, wherein the direct memory access controller circuit is configured to transport data based on source and target addresses;

wherein the direct memory access controller circuit is configured to move trace data information from the one or more memory circuits to the trace data information port, when it is determined that trace data information is available in the one or more memory circuits and that trace data information can be received by the trace data information port; and wherein the direct memory access controller circuit is directly connected to the on-chip bus.

2. The arrangement according to claim 1, wherein the trace data information relating to a series of instructions is executed by a program.

3. The arrangement according to claim 1, wherein the direct memory access controller circuit and the trace data information port are arranged on the same chip.

4. The arrangement according to claim 1, wherein the direct memory access controller circuit is configured to process memory circuit address information related to the write location of trace data information into the one or more memory circuits.

5. The arrangement according to claim 1, wherein the direct memory access controller circuit is configured to control a transport channel for the transportation of trace data information from the one or more memory circuits to the trace data information port based on information related to the trace data information port.

6. The arrangement according to claim 5, wherein the transport channel comprises the on-chip bus.

7. The arrangement according to claim 1, wherein the trace data information received by the one or more trace data information monitoring circuits is stored in the one or more memory circuits.

8. The arrangement according to claim 7, wherein the one or more trace data information monitoring circuits are configured to regulate the amount of bandwidth occupied by the received trace data information from a lower bandwidth mode to a higher bandwidth mode or from a higher bandwidth mode to a lower bandwidth mode based on information related to the one or more memory circuits.

9. The arrangement according to claim 7, wherein the one or more trace data information monitoring circuits are configured to disable their connection to the one or more trace data information sources based on information related to the one or more memory circuits.

10. The arrangement according to claim 1, wherein the direct memory access controller circuit is configured to receive from the one or more trace data information monitoring circuits the memory circuit write address information related to the write location of trace data information into the one or more memory circuits.

11. The arrangement according to claim 1, wherein the one or more trace data information monitoring circuits are configured to monitor one or more trace data information sources to receive trace data information.

12. The arrangement according to claim 1, wherein at least one of the one or more trace data information monitoring circuits is configured to be coupled to a pre-determinedly selected one or more memory circuits, such that trace data information received by the at least one of the one or more trace data information monitoring circuits is stored in the pre-determinedly selected one or more memory circuits.

13. The arrangement according to claim 12, wherein at least one of the one or more trace data information monitoring circuits is configured to be coupled to a pre-determinedly selected one or more trace data information sources, such that trace data information received by the at least one of the one or more trace data information monitoring circuits from the pre-determinedly selected one or more trace data information sources is stored in the pre-determinedly selected one or more memory circuits.

14. The arrangement according claim 1, wherein the one or more memory circuits comprises a circular buffer circuit.

15. The arrangement according to claim 1, wherein the trace data information port is a pin-based Mobile Industry Processor Interface port.

16. The arrangement according to claim 1, wherein the trace data information port may be connected to a USB user interface.

17. The arrangement according to claim 1, wherein the direct memory access controller circuit is configured to determine whether trace data information may be transported from the one or more memory circuits to the trace data information port based on information related to the trace data information port.

18. The arrangement according to claim 1, wherein the direct memory access controller circuit is configured to determine the amount of trace data information that may be stored in the one or more memory circuits based on information related to the one or more memory circuits.

19. The arrangement according to claim 1, wherein the trace data information relating to a series of instructions comprises instruction pointer information.

20. The arrangement according to claim 1, wherein the trace data information relating to a series of instructions further comprises data access information related to the series of instructions.

21. An integrated circuit comprising, a direct memory access controller circuit configured to transport data based on source and target addresses;

one or more information processing circuits configured to process trace data information relating to a series of instructions;

one or more memory circuits configured to store the trace data information;

one or more trace data information monitoring circuits configured to be in connection with the one or more memory circuits;

wherein the trace data information port is connected via an on-chip bus to the trace data information monitoring circuits; and wherein the direct memory access controller circuit is configured to manage a transport channel configured to transport trace data information to or from the one or more information processing circuits;

wherein the direct memory access controller circuit is configured to move trace data information from the one or more memory circuits to the trace data information port, when it is determined that trace data information is available in the one or more memory circuits and that trace data information can be received by the trace data information port; and wherein the direct memory access controller circuit is directly connected to the on-chip bus.

22. An integrated circuit comprising, one or more information processing circuits configured to process trace data information relating to a series of instructions;

one or more memory circuits configured to store a first portion of trace data information relating to a series of instructions and a second portion of trace data information;

one or more trace data information monitoring circuits configured to be in connection with the one or more memory circuits;

wherein the trace data information port is connected via an on-chip bus to the trace data information monitoring circuits; and a direct memory access controller circuit configured to manage the transportation of the first portion of trace data information to or from the one or more information processing circuits and the transportation of the second portion of trace data information to a trace data information port, wherein the direct memory access controller circuit is configured to transport data based on source and target addresses;

wherein the direct memory access controller circuit is configured to move trace data information from the one or more memory circuits to the trace data information port, when it is determined that trace data information is available in the one or more memory circuits and that trace data information can be received by the trace data information port; and wherein the direct memory access controller circuit is directly connected to the on-chip bus.

23. A method for processing trace data information, the method comprising, storing trace data information relating to a series of instructions, in a chip with one or more memory circuits;

providing off-chip access to the trace data information by a trace data information port;

controlling the transportation of trace data information from the one or more memory circuits to the trace data information port by a direct memory access controller circuit, wherein the direct memory access controller circuit is configured to transport data based on source and target addresses and wherein the trace data information port is connected to one or more trace data information monitoring circuits via an on-chip bus configured to be in connection with the one or more memory circuits;

wherein the direct memory access controller circuit is configured to move trace data information from the one or more memory circuits to the trace data information port, when it is determined that trace data information is available in the one or more memory circuits and that trace data information can be received by the trace data information port; and wherein the direct memory access controller circuit is directly connected to the on-chip bus.

* * * * *